(12) United States Patent
Ortega et al.

(10) Patent No.: US 6,332,122 B1
(45) Date of Patent: Dec. 18, 2001

(54) TRANSCRIPTION SYSTEM FOR MULTIPLE SPEAKERS, USING AND ESTABLISHING IDENTIFICATION

(75) Inventors: Kerry A. Ortega, Raleigh, NC (US); James R. Lewis, Delray Beach, FL (US); Ronald E. Vanbuskirk, Indiantown, FL (US); Huifang Wang, Boynton Beach, FL (US); Stephane H. Maes, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/337,392

(22) Filed: Jun. 23, 1999

(51) Int. Cl.[7] .............................. G10L 11/00; G10L 15/04; G10L 17/00; G10L 15/26; G10L 15/08
(52) U.S. Cl. ..................... 704/270; 704/231; 704/246; 704/251; 704/273; 704/235
(58) Field of Search ................................. 704/246, 271, 704/270, 275, 250.56

(56) References Cited

U.S. PATENT DOCUMENTS

| | | | |
|---|---|---|---|
| 5,526,407 | * | 6/1996 | Russell et al. ........................ 704/270 |
| 5,572,624 | * | 11/1996 | Sejnoha ................................ 704/256 |
| 5,895,447 | | 4/1999 | Ittycheriah et al. . |
| 6,023,675 | * | 2/2000 | Bennett et al. ....................... 704/270 |
| 6,067,517 | | 5/2000 | Bahl et al. . |
| 6,073,101 | * | 6/2000 | Maes .................................... 704/275 |
| 6,088,669 | | 7/2000 | Maes . |
| 6,094,632 | * | 7/2000 | Hattori ................................. 704/250 |

* cited by examiner

Primary Examiner—Richemond Dorvil
Assistant Examiner—Daniel A. Nolan
(74) Attorney, Agent, or Firm—Akerman Senterfitt

(57) ABSTRACT

A method and apparatus for transcribing text from multiple speakers in a computer system having a speech recognition application. The system receives speech from one of a plurality of speakers through a single channel, assigns a speaker ID to the speaker, transcribes the speech into text, and associates the speaker ID with the speech and text. In order to detect a speaker change, the system monitors the speech input through the channel for a speaker change.

36 Claims, 6 Drawing Sheets ly typing a

TRANSCRIPTION SYSTEM FOR MULTIPLE SPEAKERS, USING AND ESTABLISHING IDENTIFICATION

TECHNICAL FIELD

This invention relates to the field of speech recognition software and more particularly transcribing speech from multiple speakers input through a single channel using speech to text conversion techniques.

DESCRIPTION OF THE RELATED ART

Transcription is an old art that, up until the relatively recent past, has been performed by manually typing a recorded message into an electronic or physical document. More recently, speech-to-text conversion techniques have been employed to automatically convert recorded speech into text.

A difficulty arises with manual or automatic transcription techniques when multiple speakers are recorded onto a single recording (e.g., as in a recorded meeting or court proceeding). In most cases, it is desirable to identify which of the multiple speakers uttered the various phrases being transcribed. This is particularly true in court proceedings, for example, where an attorney may utter some phrases, a witness may utter others, and a judge may utter still others.

In order to automatically associate an individual with a phrase, it would be necessary to couple speaker recognition technology with the speech-to-text conversion software. Often the speech recognition systems currently available requires a speaker enroll in the system prior to use. A speaker dependent speech recognition model is developed for the enrolled speaker to optimize the quality of the text transcribed from the enrolled speaker's speech. In some cases, new people will join these meetings who have not enrolled on the speech system. In many cases, these users will participate in future meetings. Enrollment is not always feasible, and the necessity for enrollment would limit the usefulness of the transcription system.

Therefore, other methods of separating each speaker's uttered phrases are desirable. In some prior art techniques, each speaker is provided with a separate microphone, and the signals are combined into a single recording. A transcriber would then listen to the recordings and attempt to create a document by typing the speakers' statements in sequential order. However, this solution is non-optimal, because it requires the transcriber to differentiate between multiple speakers. Furthermore, any method whether manual or automated, requiring a separate channel, such as a microphone, for each speaker to input the speech into a recording increases the costs of the system.

What is needed is a method and apparatus for transcribing a recording of multiple speakers (enrolled and unenrolled) input through a single channel. What is further needed is a method and apparatus for reprocessing the transcribed text of unenrolled speakers using the input speech to optimizing the quality of the transcribed text, and future transcriptions from the speakers.

SUMMARY OF THE INVENTION

The invention provides a method of transcribing text from multiple speakers in a computer system having a speech recognition application. The system receives speech from one of a plurality of speakers through a single channel, and assigns a speaker ID to the speaker. The system then processes the speech into text using a speech recognition model, creating a document containing said text, and associates the processed speech and the text with the speaker ID assigned to the speaker. In order to detect a speaker change, the system monitors the speech input through the channel.

In another aspect of the present invention, the system transcribes the speech input into the system using a speech recognition model, and associates the transcribed speech and the text with the speaker ID assigned to the speaker. When there is a speaker change, the system assigns a different speaker ID to the different speaker. If the current speaker is an unenrolled speaker( i.e. the system does not have a speaker dependent speech recognition model associated with the assigned speaker ID), speech and text from the unenrolled speaker can be used to enroll the speaker.

According to yet another aspect, the invention may be embodied in a computer system having a text independent speech recognition application adapted for transcribing text from multiple speakers. In that case, the system includes application programming responsive to speech from a speaker of a plurality of speakers through a single channel. The system has additional programming for recognizing the voice of a speaker and assigning a speaker ID to the speaker, and for monitoring the speech for a speaker change to a different speaker.

Finally, the invention can take the form of a machine readable storage having stored thereon a computer program having a plurality of code sections executable by a machine for causing the machine to perform a set of steps including:

receiving speech from one of a plurality of speakers through a single channel;

assigning a speaker ID to said speaker providing speech through said channel;

processing said speech into text using a speech recognition model;

creating a document containing said text;

associating said processed speech and said text with said speaker ID assigned to said speaker; and monitoring said speech for a speaker change to a different speaker of said plurality of speakers.

These and still other objects and advantages of the present invention will be apparent from the description which follows. In the detailed description below, preferred embodiments of the invention will be described in reference to the accompanying drawings. These embodiments do not represent the full scope of the invention. Rather the invention can be employed in other embodiments. Reference should therefore be made to the claims herein for interpreting the breadth of the invention.

BRIEF DESCRIPTION OF THE DRAWINGS

There are presently shown in the drawings embodiments which are presently preferred, it being understood, however, that the invention is not so limited to the precise arrangements and instrumentalities shown, wherein.

DETAILED DESCRIPTION OF THE INVENTION

Figure 1:
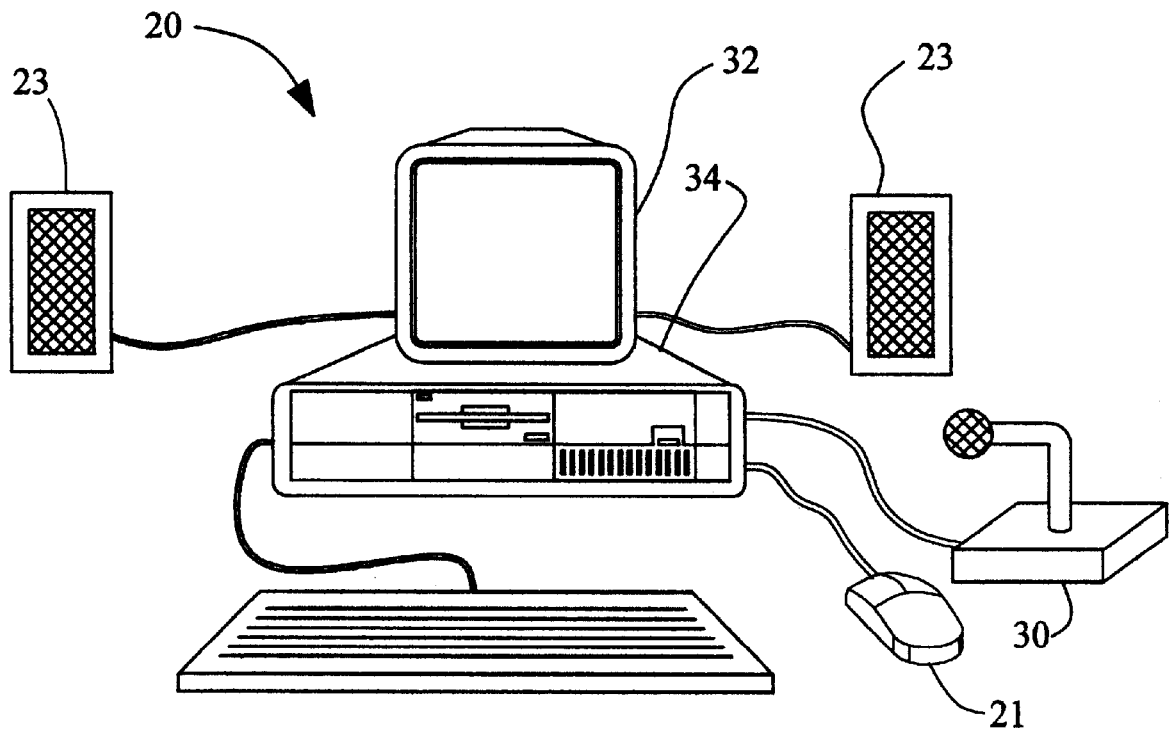
FIG. 1 is a block diagram which illustrates a computer system for speech recognition.

FIG. 1 shows a typical computer system 20 for use in conjunction with the present invention. The system is preferably comprised of a computer 34 including a central processing unit (CPU), one or more memory devices and associated circuitry. The system also includes a microphone 30 operatively connected to the computer system through suitable interface circuitry or "sound board" (not shown), and at least one user interface display unit 32 such as a video data terminal (VDT) operatively connected thereto. The microphone 30 is a single channel through which speech can be input into the computer system. The CPU can be comprised of any suitable microprocessor or other electronic processing unit, as is well known to those skilled in the art. An example of such a CPU would include the Pentium or Pentium II brand microprocessor available from Intel Corporation or any similar microprocessor. Speakers 23, as well as an interface device, such as mouse 21, can also be provided with the system, but are not necessary for operation of the invention as described herein.

The various hardware requirements for the computer system as described herein can generally be satisfied by any one of many commercially available high speed multimedia personal computers offered by manufacturers such as International Business Machines Corporation (IBM), Compaq, Hewlett Packard, or Apple Computers.

Figure 2:
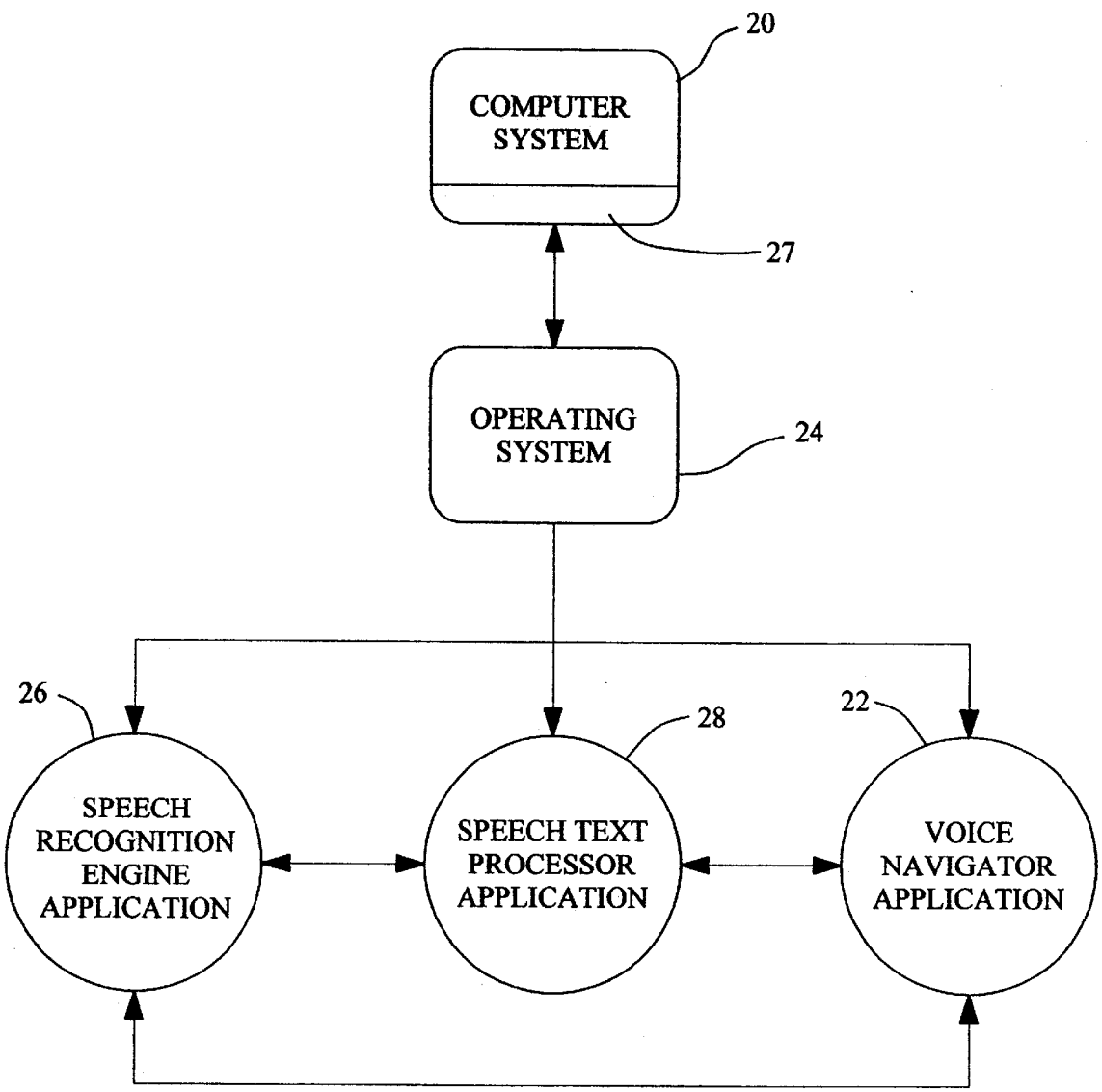
FIG. 2 is a block diagram showing a typical high level architecture for the computer system in FIG. 1.

FIG. 2 illustrates a typical architecture for a speech recognition system in computer 20. As shown in FIG. 2, the system typically includes an operating system 24 and a speech recognition engine application 26. A speech text processor 28 and a voice navigator application 22 can also be provided. In FIG. 2, the speech recognition engine 26, speech text processor 28 and the voice navigator 22 are shown as separate application programs. It should be noted however that the invention is not limited in this regard, and these various application could, of course be implemented as a single, more complex application program. Also, if no other speech controlled application programs are to be operated in conjunction with the speech text processor 28 and speech recognition engine 26, then the system can be modified to operate without the voice navigator application 22. The voice navigator 22 primarily helps coordinate the operation of the speech recognition engine application.

In a preferred embodiment which shall be discussed herein, operating system 24 is one of the Windows family of operating systems, such as Windows NT, Windows 95 or Windows 98 which are available from Microsoft Corporation of Redmond, Wash. However, the system is not limited in this regard, and the invention can also be used with any other type of computer operating system. The system as disclosed herein can be implemented by a programmer, using commercially available development tools for the operating systems described above. As shown in FIG. 2, computer system 20 includes a computer memory device 27, which is preferably comprised of an electronic random access memory and a bulk data storage medium, such as a magnetic disk drive.

Audio signals representative of sound received in microphone 30 are processed within computer 20 using conventional computer audio circuitry so as to be made available to the operating system 24 in digitized form. The audio signals received by the computer are conventionally provided to the speech recognition engine application 26 via the computer operating system 24 in order to perform speech recognition functions. As in conventional speech recognition systems, the audio signals are processed by the speech recognition engine 26 to identify words spoken by a speaker into microphone 30. In the present invention, the identified words are then transcribed into text by the speech text processor 28 to create an electronic document having text associated with the speaker.

In this particular system, the speech recognition engine recognizes speech of enrolled and unenrolled speakers using models such as disclosed in U.S. Pat. No. 6,088,669, which is fully incorporated herein by reference. An enrolled speaker is a speaker who has previously trained the speech recognition engine to recognize the speakers speech using a speaker dependent speech recognition model. An unenrolled speaker is a speaker who has not previously trained the speech recognition engine which then uses a speaker independent speech recognition model to recognize the speech.

Figure 3:
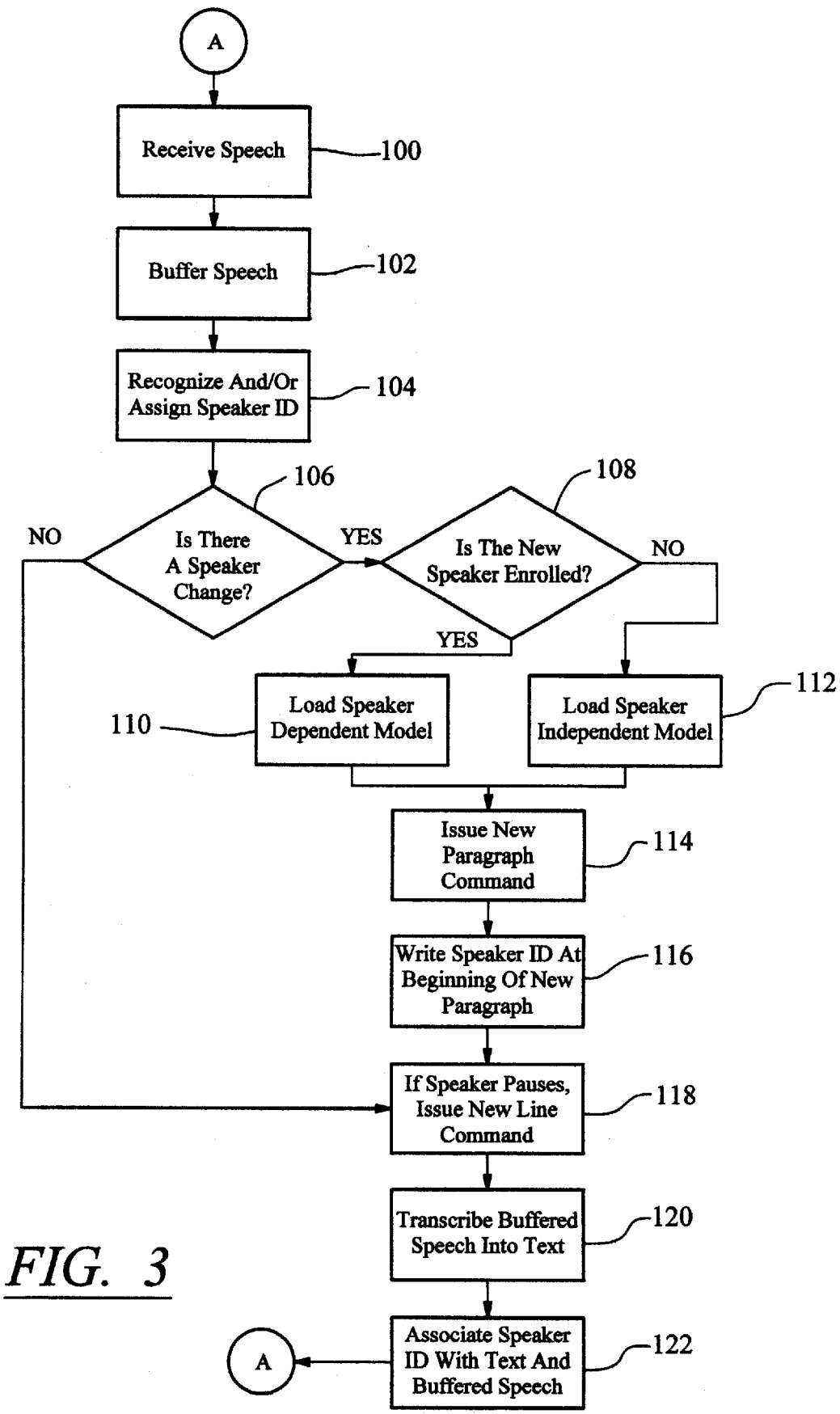
FIG. 3 shows a flow chart illustrating the process according to the present invention.

FIG. 3 illustrates the steps in a preferred embodiment incorporating the present invention. As shown in FIG. 3, step 100, the speech recognition application receives speech through a single channel, such as a digital file, in real-time through the microphone 30, or the like. The system buffers the speech 102 by storing it in the computer memory device 27, assigns a speaker ID 104 to the speaker, determines whether the speaker has changed 106, and then proceeds to transcribe the buffered speech 108, 110, 112, 114, 116, 118, and 120, into text in the document. The text in the document and the buffered speech are then associated with the speaker ID 122 which can be used as described below. The process is repeated until the speech ceases.

Preferably, the speaker ID is assigned 104 using a text-independent speaker identification function, such as disclosed in U.S. Pat. No. 6,067,517 which is fully incorporated herein by reference. In U.S. Pat. No. 6,067,517, a portion of a speech signal from a single speaker is divided into frames. The frames of speech are compared to a database of speech characteristics of enrolled speakers. If the speech frames have the characteristics of an enrolled speaker, it assigns the speaker ID of the matched enrolled speaker, and uses a speaker dependent model associated with that speaker ID to transcribe the speech signal. If the portion of the speech signal does not have the characteristics of an enrolled speaker, the speaker is considered unknown, and a speaker independent model is used to transcribe the speech signal.

In the current system, if the characteristics of the portion of the speech signal match those of an enrolled speaker, the system assigns the enrolled speaker's preassigned speaker ID of the matched enrolled speaker to the speaker. If the text-independent speaker identification function fails to match an enrolled speaker, the system assigns a temporary ID. The system keeps track of different unidentified speakers by assigning them temporary IDs such as Unknown Speaker 1, Unknown Speaker 2, and so on.

In order to minimize the number of potential candidate enrolled speakers to match, before the system begins transcribing the speech signal, the user can (but does not necessarily need to) define which enrolled speakers are expected in the conversation. This limits the processing time required to identify the speaker by limiting the number of candidate speakers to just those speakers in the conversation instead of all speakers enrolled on the system (i.e. previously assigned a Speaker ID). Of course, in the case of transcribing just one speaker, such as during dictation, the user can turn off the automatic speaker ID checking or limit the candidate speakers to the sole speaker to improve performance of the system.

Preferably, once a speaker ID is assigned, the current speaker's ID is displayed, for example, in a speech bar on the display 32. Advantageously, by identifying the speaker of the transcribed text in real time, the system can be used for a plurality of purposes, including an automatic captioning system for movies, television, or multi-media files.

As shown in FIG. 3, step 106, the system constantly monitors the incoming speech signal for a speaker change by continuously identifying the incoming speech signal using methods known in the art, such as disclosed in U.S. Pat. No. 6,067,517. Of course, the original onset of the speech signal will be recognized as a new speaker. Referring to FIG. 3, step 108, if the new speaker is an enrolled speaker, the system loads the speaker dependent models in step 110 associated with the new speaker's speaker ID, and processes the speech signal by the new speaker in step 120. Referring back to step 108, if the speaker in not enrolled, the system loads a speaker independent model in step 112, and processes the speech signal by the new speaker in step 112. The Speech signal is processed into text using methods, such as disclosed in U.S. Pat. Nos. 6,067,517 and 6,088,669, which are fully incorporated herein by reference.

Current speech systems require users to speak punctuation (e.g., period, comma, etc.), but this won't happen in normal speech. Therefore preferably, when a new speaker is detected, the system will automatically perform a "New-Paragraph" command shown in FIG. 3, step 114. The "New Paragraph" command causes the system to process the transcribed text of the new speaker into a new paragraph of the document. Most preferably, the user will have the option to precede each new paragraph in the document with the name of the current speaker as identified by the speaker ID. In one embodiment, both the speech and text are also time stamped, with the time stamp preceding the text of each new speaker in the document.

Pauses in a speech signal are preferably recognized, and indicated in the transcribed text by a new line. As shown in FIG. 3, step 118, if the speaker pauses the system, the system will perform a "New-Line" command to indicate a pause has occurred. The system recognizes a pause as a predetermined period of time, such as 5 seconds, in which the system is operating, but there has been no speech. By associating speaker IDs with the transcribed text representing the buffered speech signal from each speaker in a conversation and the speech signal from which the text was transcribed, the source of the text can be readily identified when viewed in a user interface. For example, if after transcription, the user clicks on an area of text, the speaker's ID that was used to transcribe the text is shown in a user ID area of the interface. Preferably, if marked text covers multiple speakers, the user ID area displays an identifier indicating multiple speakers, such as "Multiple Speakers," which can be expanded to display all of the speakers of the selected text.

Figure 4:
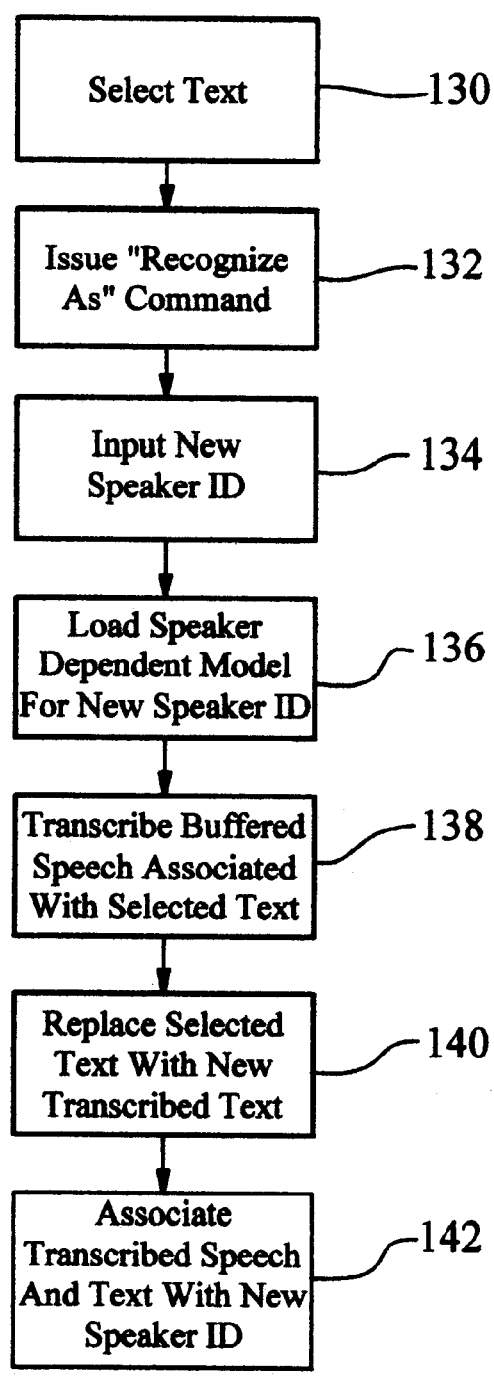
FIG. 4 shows a flow chart illustrating the "Recognize as" command.

Advantageously, by associating the speaker ID with the text and speech source, the text can be reprocessed to provide a more correct transcription by utilizing a "Recognize as" command, as shown in FIG. 4. For example, if the user can tell the wrong speaker ID was used to process selected text or a temporary ID was assigned to the speech of an enrolled user, the "Recognize as" command allows the user to reassign the speaker ID and re-process the selected speech with the speaker dependent model associated with a different speaker's ID. Text may be selected in a user interface using methods known in the art, such as by highlighting the text using a mouse. As shown in FIG. 4, once the user has selected the text 130, issued the "Recognize as" command 132, input a speaker ID, such as selecting from a list, and the system has loaded the new speaker dependent model 136, the system reprocesses the speech signal associated with the selected text 138. The system then replaces the old text with the new text 140, and then associates the new text and the speech signal with the new speaker ID 142. Preferably, as suggested above, this is a menu item that shows a list of speaker IDs to choose from, but could also be a speech command.

Figure 5:
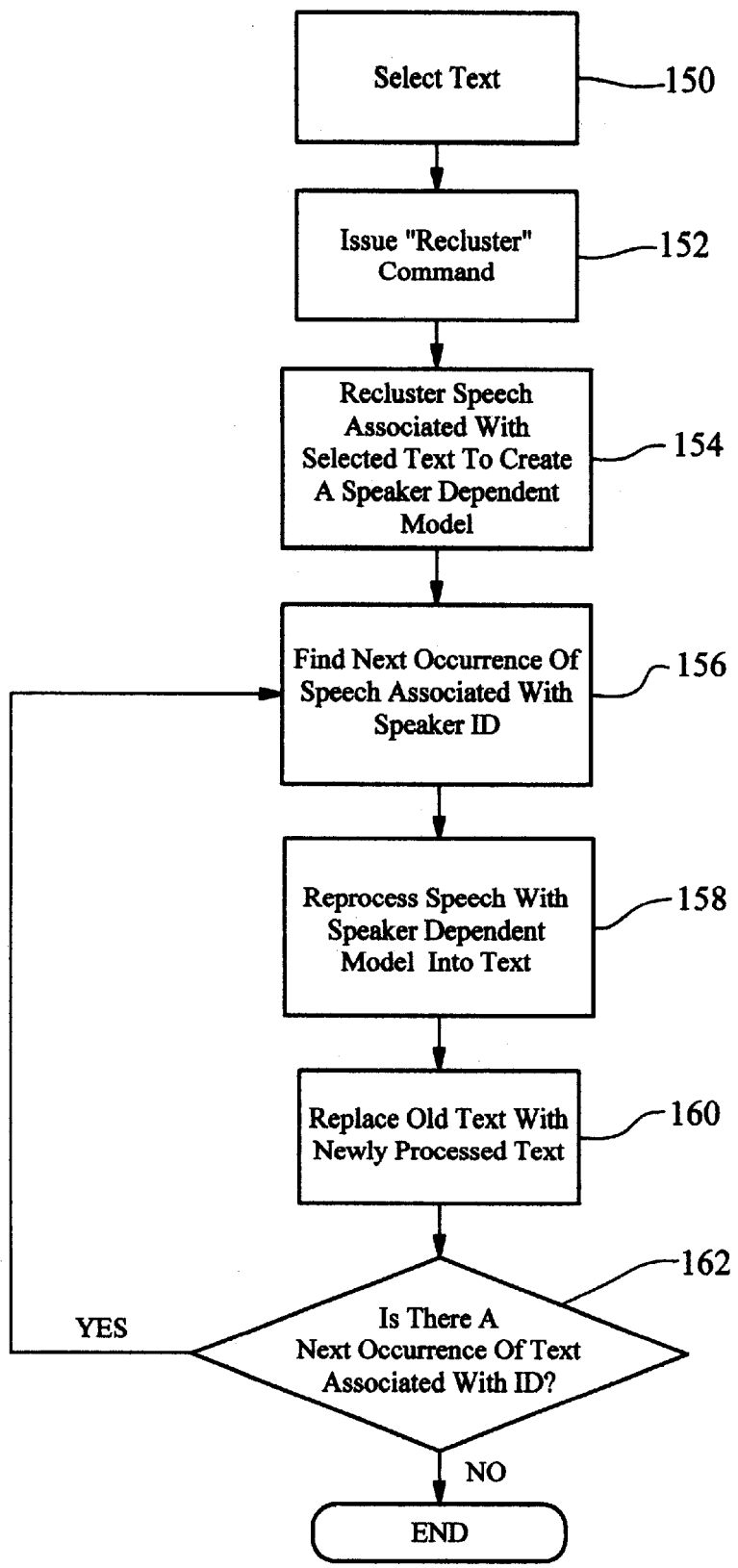
FIG. 5 shows a flow chart illustrating the "Recluster" command.

The text in the document transcribed from a speech signal provided by an unenrolled user may be reclustered (i.e. analyzed) to develop a speaker dependent speech recognition model for reprocessing all other instances of the unenrolled speakers speech by using a "Recluster" command. Preferably, the text is corrected prior to reclustering to provide a more accurate speaker dependent model. As shown in FIG. 5, the user selects the text produced by the unenrolled speaker for reclustering 150. The selected text and corresponding speech is reclustered 152 to develop a speaker dependent model using methods, such as disclosed in U.S. Pat. No. 5,895,447, which is fully incorporated herein by reference.

Figure 6:
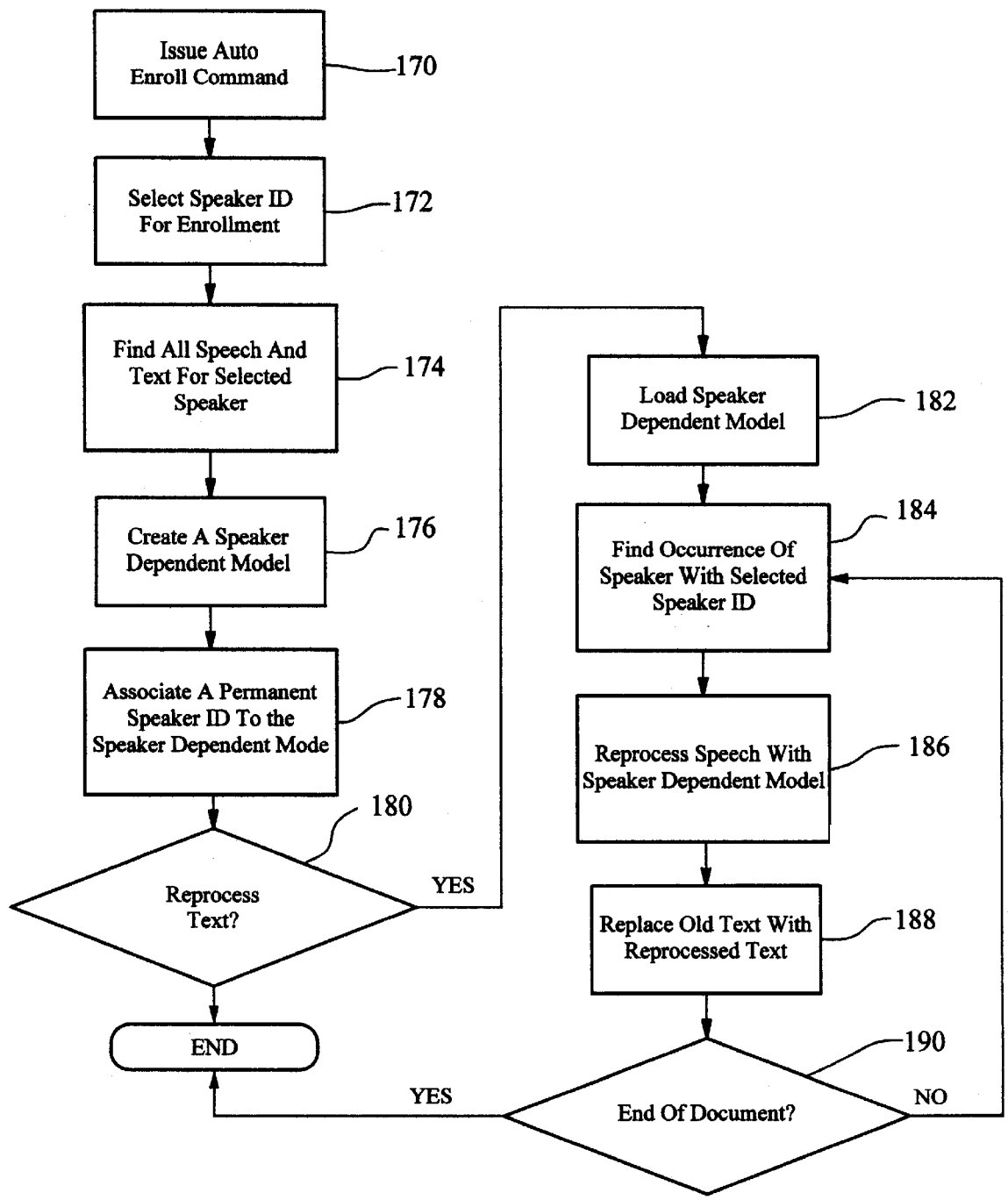
FIG. 6 shows a flow chart illustrating the "Auto Enroll".

The present system also provides a quick method to enroll a previously unenrolled speaker using speech collected during a conversation without requiring the user to go through an enrollment process. The system provides an "Auto Enroll" command (either menu or voice) to enroll the unenrolled speaker. As shown in FIG. 6, upon issuance of the command 170, the user selects the temporary ID of one of the unenrolled speakers 172, the system gathers all of the unenrolled speaker's data (text and speech) 174 in a file, runs the data in the file through an unsupervised enrollment (i.e. clustering the data and building a speaker dependent model) 176, and then associates a permanent speaker ID with the speaker dependent model 178. The speech segments need not be corrected. However, correction of the speech segments will result in a better enrollment (i.e. a more accurate speaker dependent model) for the new speaker. The clustering and building of speaker dependent models is disclosed in U.S. patent application Ser. No. 08/787,029 which has been fully incorporated herein by reference.

As shown in FIG. 6, once the speaker dependent model is developed, the user is presented with the option of reprocessing the selected speaker's text 180 using the speaker dependent model. If the user elects to reprocess the text, the speaker dependent model is loaded 182 into the computer memory, and each occurrence of the selected speaker's text is found 184, reprocessed 186, and substituted for the old text 188. This reprocessing continues until all of the speaker's text in the document is reprocessed 190.

By associating the speaker ID with the buffered speech signal and text, the system may provide several functions to locate the text of different speakers which aids the user in proofreading. For example, one or more of the functions listed below may appear in menus as well as voice commands:

1) Find next unrolled speaker. This function allows the user to find each unrolled speaker's ID so that clustering can be run. Successive invocations of the function finds the first instance of next unrolled speaker.
2) Find the next/previous instance of a specific speaker.
3) Jump to the beginning of text for next or previous speaker.

4) Jump to the beginning of next text or previous text of the current speaker.

5) Sort paragraphs by time/sort paragraphs by speaker. Sorting by speaker is useful in the case of correcting their text in order to enroll them into the system.

6) Represent a speaker's text by using a particular color or font.

The invention disclosed herein can be embodied in many different applications incorporating speech recognition. For example, the following applications are often limited to a single input channel which receives speech from a plurality of speakers.

1) A meeting minute taker;
2) A teleconference tagger;
3) A multi-user dictation system;
4) A family voice-enabled bulletin board; and
5) An automatic captioning system.

For example, in an automatic captioning system, typically, it is hard to correctly synchronize the caption texts with movies, TV or multi-media file. However, in an embodiment of the present invention, the captions are time synchronized with periodic time stamps, and associated with speaker IDs for each speaker. In this case, the captions can be correctly synchronized, automatically or by a human operator.

The present invention also allows a user to certify the authorship of a paragraph, a sentence or a text. A typical example would be in a negotiation meeting to be able to certify who agrees or states what. Similarly, for applications such as in the medical field, wherein a jointly drafted report with its modification and corrections can be attributed to very specific practitioners or assistants.

While the foregoing specification illustrates and describes the preferred embodiments of this invention, it is to be understood that the invention is not limited to the precise construction herein disclosed. The invention can be embodied in other specific forms, such as described above, without departing from the spirit or essential attributes. Accordingly, reference should be made to the following claims, rather than to the foregoing specification, as indicating the scope of the invention.

What is claimed is:

1. In a computer system having a text independent speech recognition application, a method of transcribing text from multiple speakers comprising the steps of:
   receiving a speech signal from one of a plurality of speakers through a single channel;
   assigning a unique speaker ID to said speaker providing said speech signal through said channel;
   processing said speech signal into text using a speech recognition model;
   creating a document containing said text;
   associating said processed speech signal and said text in said document with said unique speaker ID assigned to said speaker; and,
   monitoring said speech signal for a speaker change to a different one of said plurality of speakers.

2. In a method of transcribing text from multiple speakers as claimed in claim 1, further comprising the step:
   assigning a different unique speaker ID to said different speaker.

3. In a method of transcribing text from multiple speakers as claimed in claim 2, further comprising the step:
   associating said processed speech signal and said text in said document from said different speaker with said different unique speaker ID.

4. In a method of transcribing text from multiple speakers as claimed in claim 1, wherein said speech signal is buffered.

5. In a method of transcribing text from multiple speakers as claimed in claim 1, wherein at least one of said speakers is an enrolled speaker, and a preassigned unique speaker ID is assigned to said enrolled speaker.

6. In a method of transcribing text from multiple speakers as claimed in claim 1, wherein text in said document which has been processed from portions of said speech signal which can be attributed to one speaker is distinguished from text in said document which has been processed from other portions of said speech signal which can be attributed to different speakers.

7. In a method of transcribing text from multiple speakers as claimed in claim 6, wherein text in said document which can be attributed to different speakers is distinguished by starting a new paragraph in said document for every speaker change.

8. In a method of transcribing text from multiple speakers as claimed in claim 1, wherein at least one of said speakers is an unenrolled speaker.

9. In a method of transcribing text from multiple speakers as claimed in claim 8, wherein a speech signal and corresponding processed text from said unenrolled speaker is used to enroll said speaker.

10. In a method of transcribing text from multiple speakers as claimed in claim 8, wherein at least a portion of said speech signal and corresponding processed text from said unenrolled speaker is used to develop a speaker dependent speech recognition model.

11. In a method of transcribing text from multiple speakers as claimed in claim 10, wherein said speaker dependent model is used to reprocess the text in said document for said unenrolled speaker.

12. In a method of transcribing text from multiple speakers as claimed in claim 1, wherein a different speech recognition model is used to reprocess said text in said document.

13. In a computer system having a text independent speech recognition application adapted for transcribing text from multiple speakers comprising:
   means for receiving a speech signal from one of a plurality of speakers through a single channel;
   means for assigning a unique speaker ID to said speaker providing said speech signal through said channel;
   means for processing said speech signal into text using a speech recognition model;
   means for creating a document containing said text;
   means for associating said processed speech signal and said text in said document with said unique speaker ID assigned to said speaker; and,
   means for monitoring said speech signal for a speaker change to a different one of said plurality of speakers.

14. In a system as claimed in claim 13, further comprising:
   means for assigning a different unique speaker ID to said different speaker.

15. In a system as claimed in claim 14, further comprising:
   means for associating said processed speech signal and said text in said document from said different speaker with said different unique speaker ID.

16. In a system as claimed in claim 13, wherein said speech signal is buffered.

17. In a system as claimed in claim 13, wherein at least one of said speakers is an enrolled speaker, and a preassigned unique speaker ID is assigned to said enrolled speaker.

18. In a system as claimed in claim 13, wherein text in said document which has been processed from portions of said speech signal which can be attributed to one speaker is distinguished from text in said document which has been processed from other portions of said speech signal which can be attributed to different speakers.

19. In a system as claimed in claim 18, wherein text in said document which can be attributed to different speakers is distinguished by starting a new paragraph in said document for every speaker change.

20. In a system as claimed in claim 13, wherein at least one of said speakers is an unenrolled speaker.

21. In a system as claimed in claim 20, wherein a speech signal and corresponding processed text from said unenrolled speaker is used to enroll said speaker.

22. In a system as claimed in claim 8, wherein at least a portion of said speech signal and corresponding processed text from said unenrolled speaker is used to develop a speaker dependent speech recognition model.

23. In a system as claimed in claim 22, wherein said speaker dependent model is used to reprocess the text in said document for said unenrolled speaker.

24. In a system as claimed in claim 13, wherein a different speech recognition model is used to reprocess said text in said document.

25. A machine readable storage, having stored thereon a computer program having a plurality of code sections executable by a machine for causing the machine to perform the steps of:

receiving a speech signal from one of a plurality of speakers through a single channel;

assigning a unique speaker ID to said speaker providing said speech signal through said channel;

processing said speech signal into text using a speech recognition model;

creating a document containing said text;

associating said processed speech signal and said text in said document with said unique speaker ID assigned to said speaker; and, monitoring said speech signal for a speaker change to a different one of said plurality of speakers.

26. The machine readable storage as claimed in claim 25, further including a plurality of code sections executable by a machine for causing the machine to perform the step of:

assigning a different unique speaker ID to said different speaker.

27. The machine readable storage as claimed in claim 26, further including a plurality of code sections executable by a machine for causing the machine to perform the step of:

associating said processed speech signal and said text in said document from said different speaker with said different unique speaker ID.

28. The machine readable storage as claimed in claim 25, wherein said speech signal is buffered.

29. The machine readable storage as claimed in claim 25, wherein at least one of said speakers is an enrolled speaker, and a preassigned unique speaker ID is assigned to said enrolled speaker.

30. The machine readable storage as claimed in claim 25, wherein text in said document which has been processed from portions of said speech signal which can be attributed to one speaker is distinguished from text in said document which has been processed from other portions of said speech signal which can be attributed to different speakers.

31. The machine readable storage as claimed in claim 30, wherein text in said document which can be attributed to different speakers is distinguished by starting a new paragraph in said document for every speaker change.

32. The machine readable storage as claimed in claim 25, wherein at least one of said speakers is an unenrolled speaker.

33. The machine readable storage as claimed in claim 32, wherein a speech signal and corresponding processed text from said unenrolled speaker is used to enroll said speaker.

34. The machine readable storage as claimed in claim 32, wherein at least a portion of said speech signal and corresponding processed text from said unenrolled speaker is used to develop a speaker dependent speech recognition model.

35. The machine readable storage as claimed in claim 34, wherein said speaker dependent model is used to reprocess the text in said document for said unenrolled speaker.

36. The machine readable storage as claimed in claim 25, wherein a different speech recognition model is used to reprocess said text in said document.

\* \* \* \* \*